(12) United States Patent
Cheng (10) Patent No.: US 6,672,445 B1
(45) Date of Patent: Jan. 6, 2004

(54) WORKING PLATFORM FOR ASSEMBLY LINE

(75) Inventor: Chun-Yang Cheng, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 0 days.

(21) Appl. No.: 10/259,758

(22) Filed: Sep. 30, 2002

(51) Int. Cl.⁷ .............................................. B65G 37/00
(52) U.S. Cl. ................................ 198/346.1; 198/346.2; 198/611
(58) Field of Search ........................... 198/346.1, 346.2, 198/611, 309, 310, 313; 193/35 SS, 38; 269/46, 63

(56) References Cited

U.S. PATENT DOCUMENTS

| | | | | |
|---|---|---|---|---|
| 3,072,095 A | * | 1/1963 | Keessen et al. .......... | 198/346.1 |
| 5,421,446 A | * | 6/1995 | Koch et al. .............. | 198/369.7 |
| 5,577,593 A | * | 11/1996 | Hooper .................... | 198/346.1 |
| 6,019,211 A | * | 2/2000 | Masciarelli, Jr. ......... | 198/346.2 |

* cited by examiner

Primary Examiner—Douglas Hess
(74) Attorney, Agent, or Firm—Browdy and Neimark, P.L.L.C.

(57) ABSTRACT

A working platform for an assembly line includes a frame and a guiding mechanism. The frame is mounted over a conveying belt of the assembly line. The frame oppositely has an entry side and an exit side. The guiding mechanism is mounted in the frame. The assembly precision is enhanced by stopping workpieces to be assembled the working platform. Since the workpieces is assembled on the working platform, the assembly labor and cost are reduced.

20 Claims, 8 Drawing Sheets

WORKING PLATFORM FOR ASSEMBLY LINE

BACKGROUND OF THE INVENTION

1. Field of the Invention

The invention relates to a working platform for an assembly line. More particularly, the invention provides a working platform that keeps workpieces at a desired location so that they can be assembled with an enhanced precision.

2. Description of the Related Art

Figure 1:
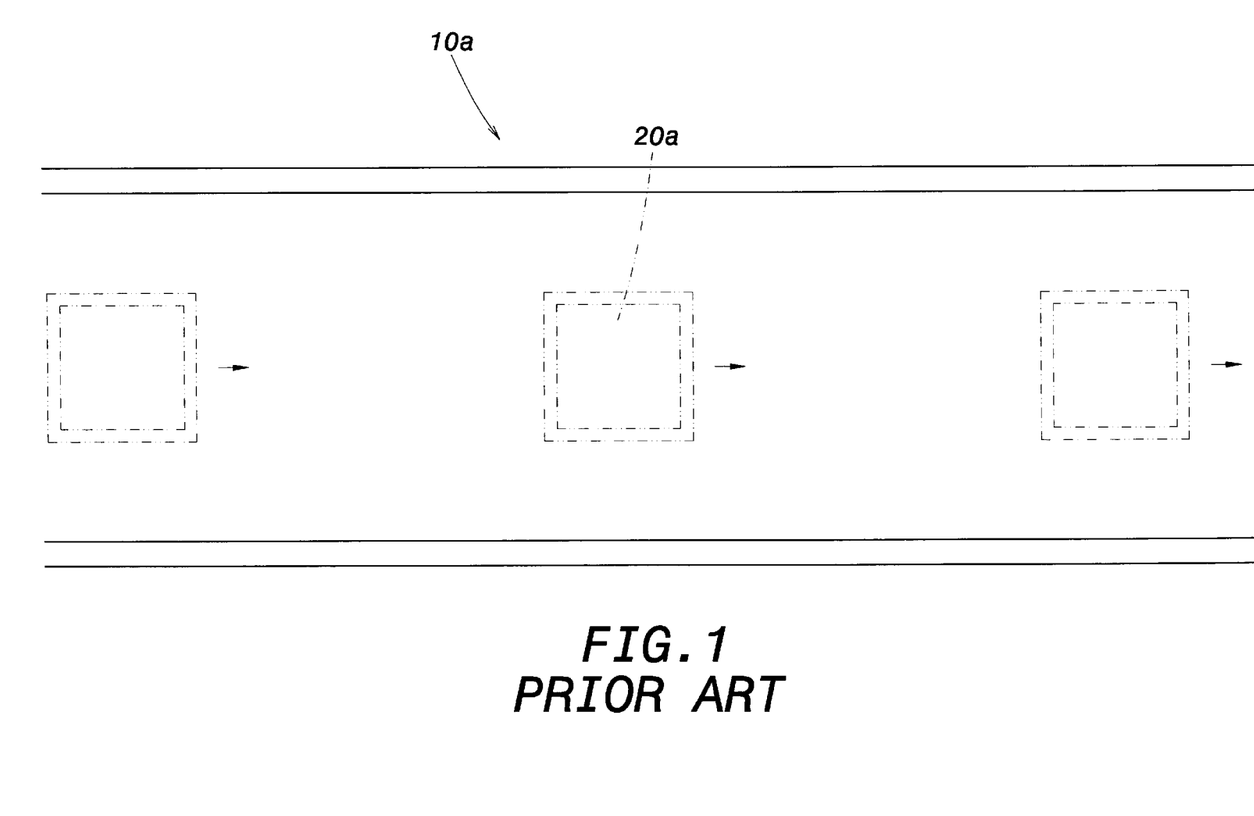
FIG. 1 is a top view of a conventional assembly line.
Figure 2:
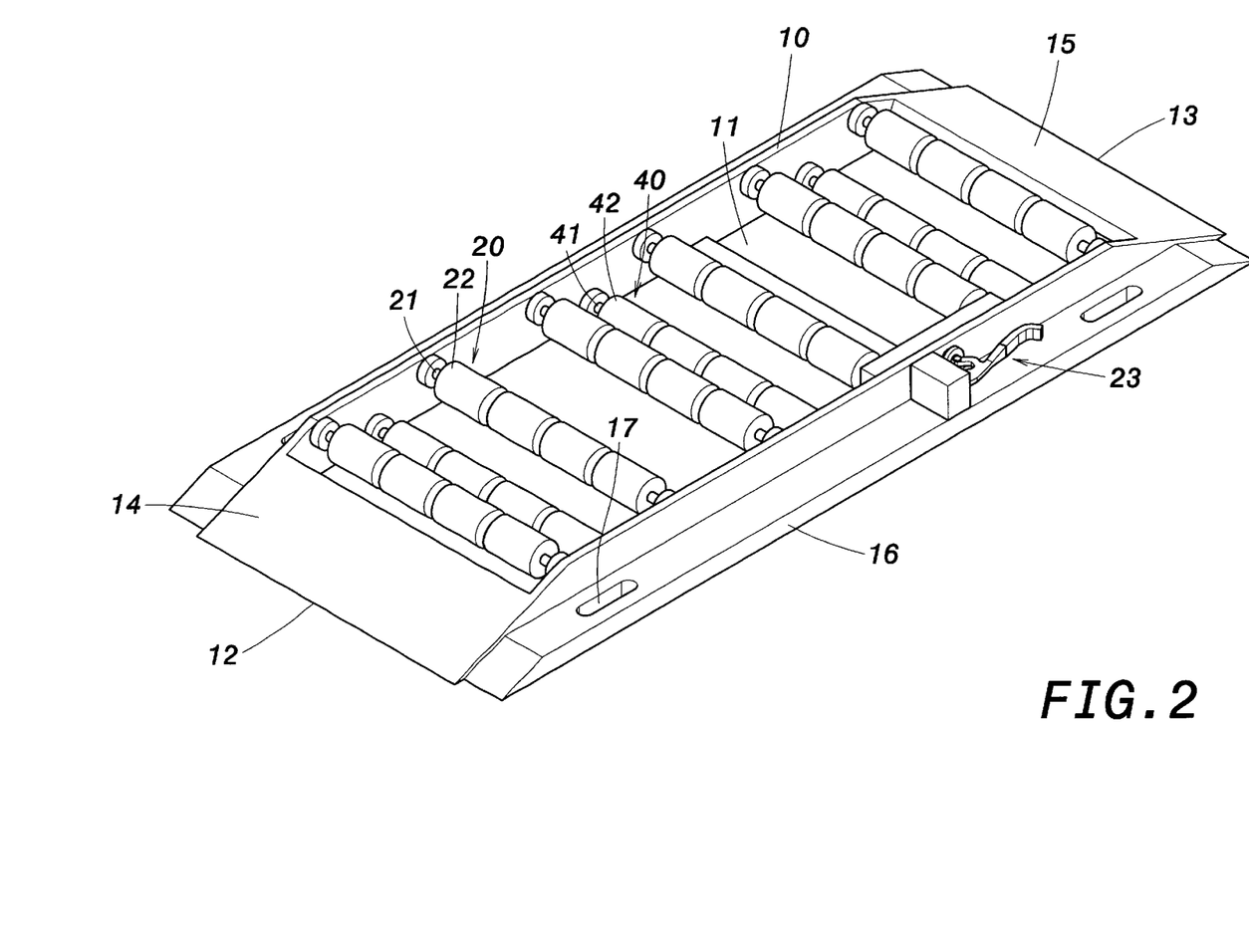
FIG. 2 is a perspective view of a working platform for an assembly line according to a first embodiment of the invention.
Figure 3:
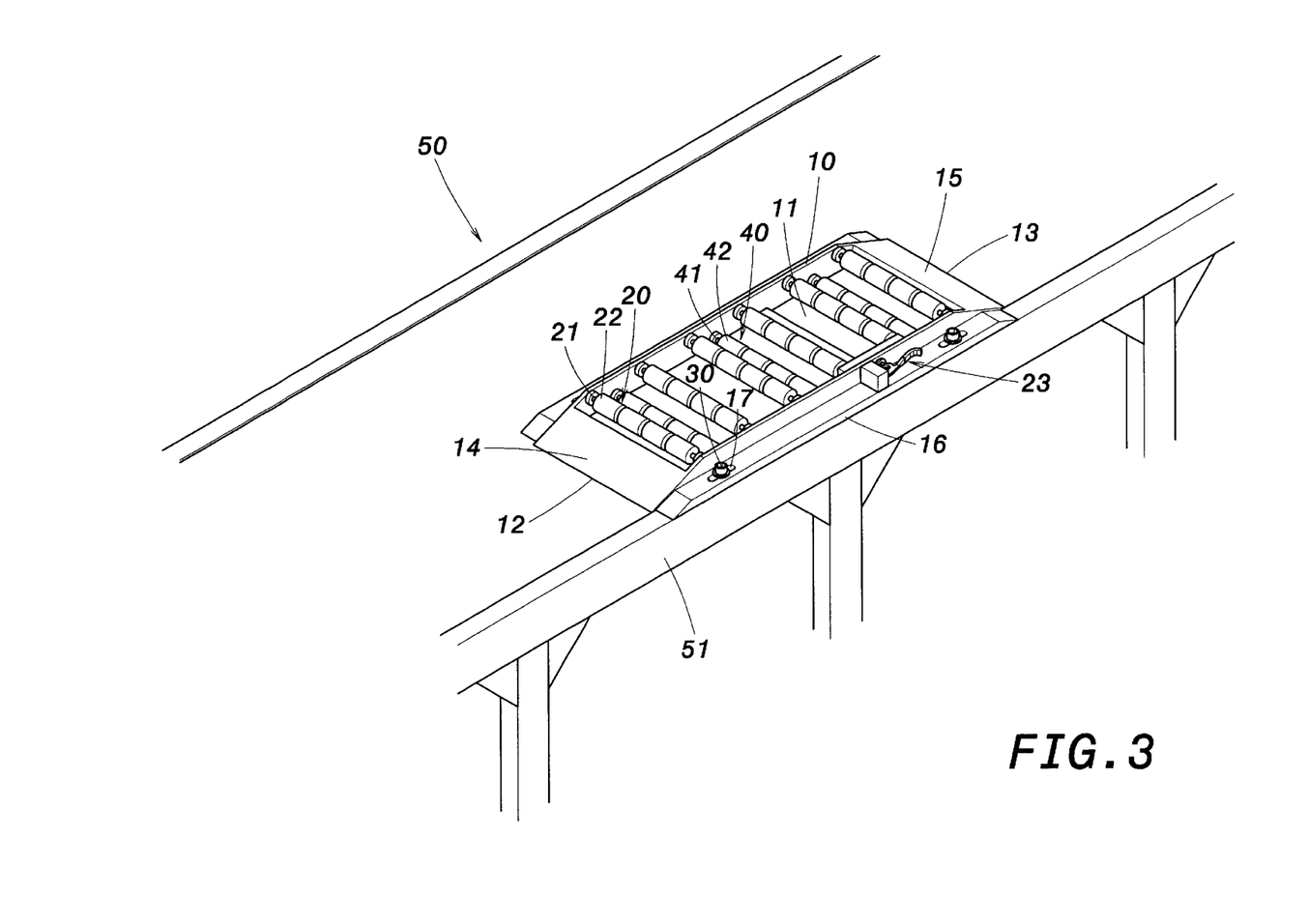
FIG. 3 is a perspective view of a working platform mounted on an assembly line according to a first embodiment of the invention.
Figure 4:
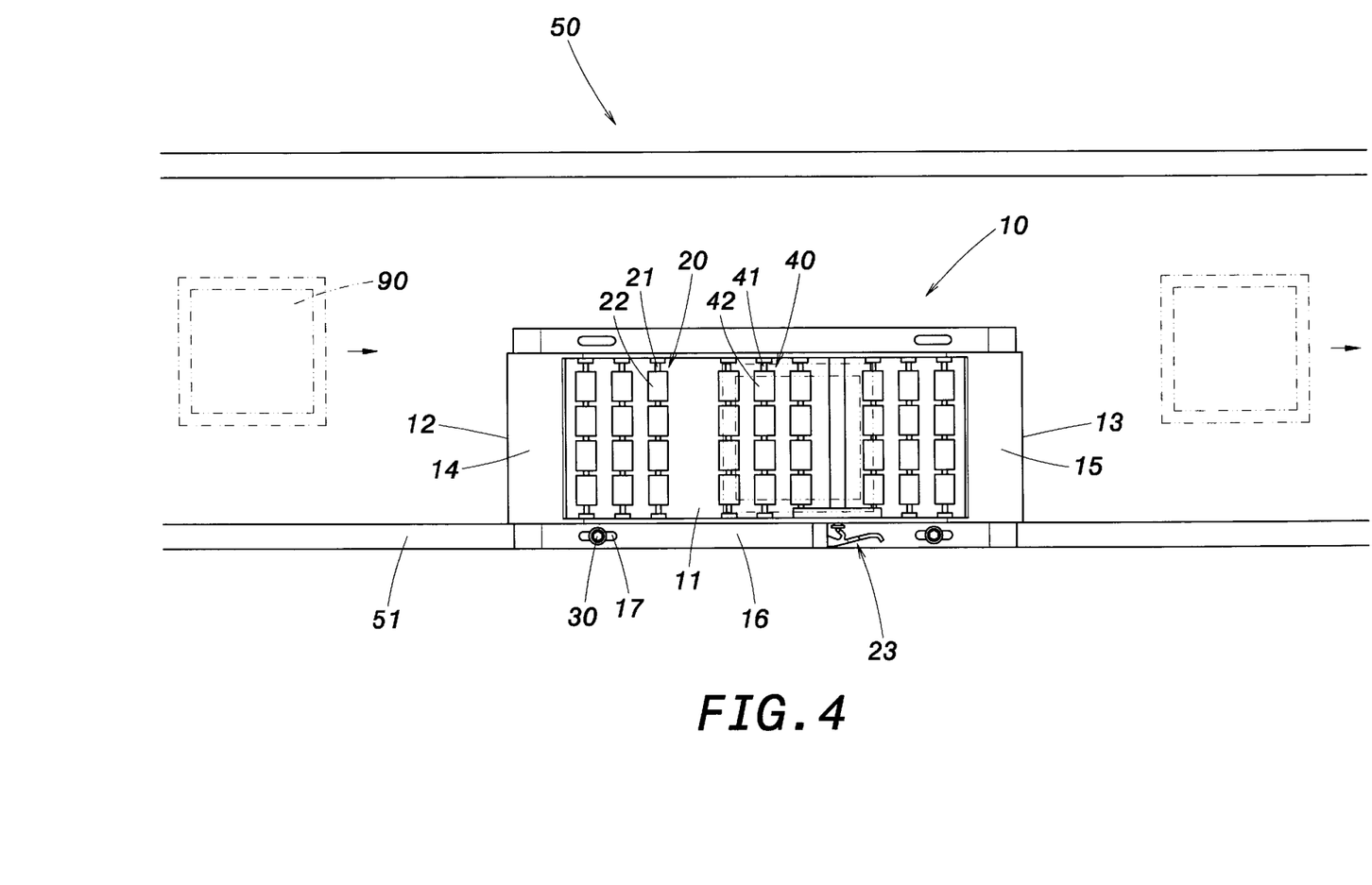
FIG. 4 is a top view of a working platform mounted on an assembly line according to a first embodiment of the invention.

As shown in FIG. 1, an assembly line usually includes conveying belt 10a that conveys workpieces 20a to be assembled. The workpieces are continuously conveyed from one operator to another operator in the assembly line. To obtain a precise assembly, the operator usually has to transfer the workpieces 20a from the conveying belt 10a to another place (such as working table) where the assembly operation is effectively performed, which may be time-consuming and affects the efficiency of the assembly operation.

SUMMARY OF THE INVENTION

It is a principal object of the invention to provide a working platform for assembly line, by means of which workpieces are stopped to perform the assembly, which improves the assembly precision. Since the workpieces are assembled on the working platform, the assembly labor and cost are thus reduced.

In order to achieve the above and other objectives, a working platform for assembly line of the invention includes a frame and a guiding mechanism. The frame is located above a conveying belt of the assembly line. The frame oppositely has an entry side and an exit side. The guiding mechanism is mounted in the frame.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Wherever possible in the following description, like reference numerals will refer to like elements and parts unless otherwise illustrated.

With reference to FIG. 2 through FIG. 5, a working platform for an assembly line according to an embodiment of the invention is provided. The working platform includes a frame 10 and a guiding mechanism 20. The frame 10 defines a space 11 therein. The frame 10 is preferably a hollow rectangular parallelepiped. The frame 10 oppositely includes an entry side 12 and an exit side 13. The entry side 12 and the exit side 13 are respectively formed by inclined surfaces 14, 15. The inclined surfaces 14 and 15 respectively guide one or more workpieces 90 to be assembled from a conveying belt 50 of an assembly line to the working platform and from the working platform to the conveying belt 50.

One side of the frame 10 along the conveying direction of the conveying belt 50 is provided with an attachment member 16. The attachment members 16 is provided with a plurality of slots 17 through which screws 30 respectively engage one fixing rod 51 located at one side of the track of the conveying belt 50. Thereby, the frame 10 is fixedly fastened to the fixing rod 51. A gap is arranged between the frame 10 and the conveying belt 50 so that the frame 10 remains stationary without impeding the conveying belt 50 in movement.

Figure 5:
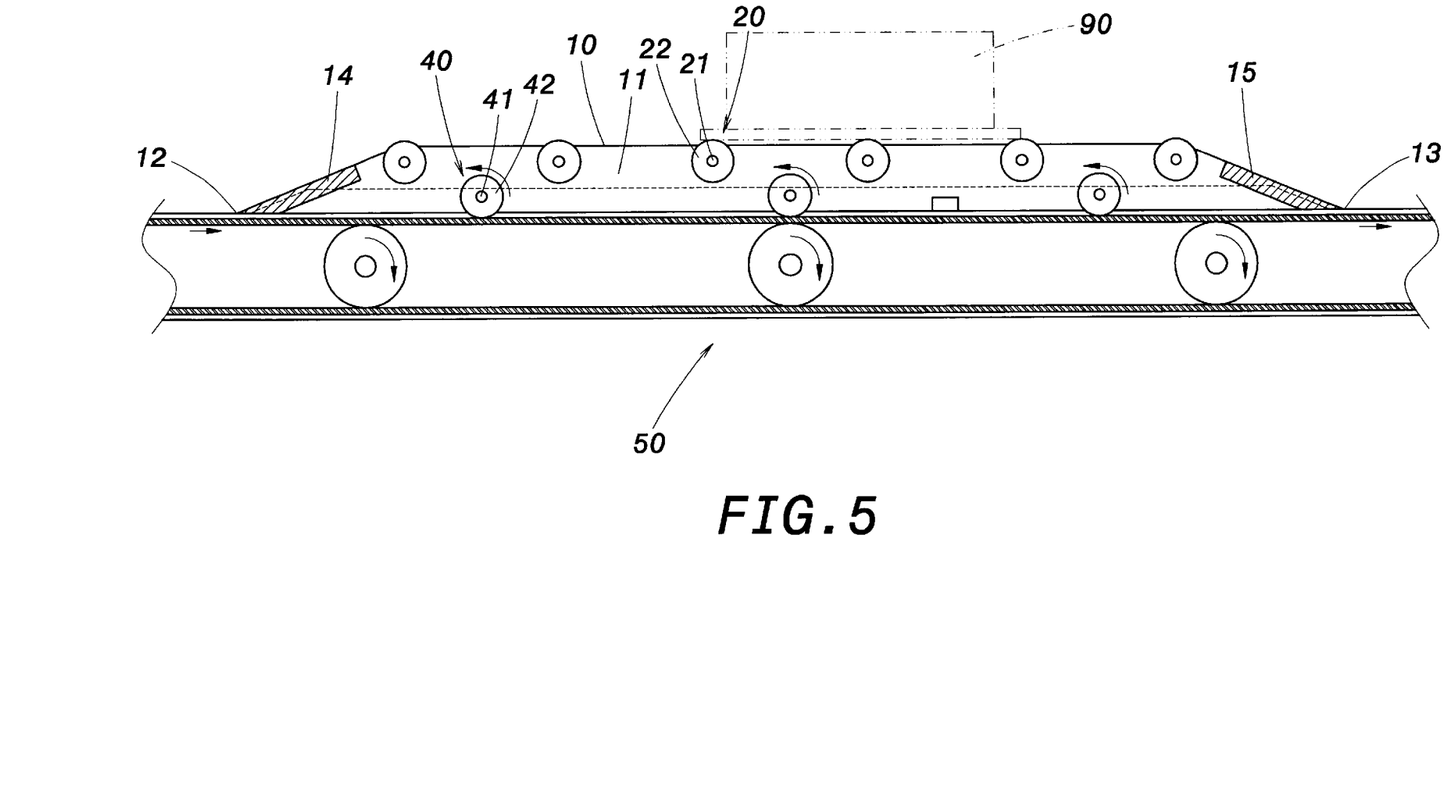
FIG. 5 is a cross-sectional view of a working platform mounted on an assembly line according to a first embodiment of the present invention.

The guiding mechanism 20 is mounted inside the space 11 of the frame 10. The guiding mechanism 20 includes a plurality of spindles 21 and rollers 22. The rollers 22 are respectively coupled with the spindles 21. The spindles 21 are pivotally connected to the frame 10 so that the workpieces 90 move along the moving direction of the assembly line as the spindles 21 and the roller 22 rotate. The spindles 21 are spaced apart from and parallel to one another. Each of the spindles 21 and rollers 22 is perpendicular to the moving direction of the conveying belt 50. The rollers 22 upwardly protrude over the frame 10 so that the workpieces 90 are transferred through the frame 10 via sliding contacting with the rollers 22, as shown in FIG. 5.

A supporting structure 40 is further provided in a central portion of the space 11 to prevent the conveying belt 50 from contacting the frame 10. The supporting structure 40 includes a plurality of supporting spindles 41 and supporting rollers 42. The supporting rollers 42 are respectively coupled with the supporting spindles 41. The supporting spindles 41 are pivotally connected to the frame 10 to freely rotate. The supporting spindles 41 are spaced apart from and parallel to one another. Each of the supporting spindles 41 and supporting rollers 42 is perpendicular to the moving direction of the conveying belt 50. The supporting rollers 42 in the frame 10 downwardly protrude so as to be in sliding contact with the underlying conveying belt 50. Via the supporting structure 40, the conveying belt 50 is thereby separated from the frame 10.

The frame 10 may be further provided with a lock mechanism 23 to lock the spindle 21. The lock mechanism 23 is connected to at least one of the spindles 21 of the guiding mechanism 20. When an operator wants the workpieces to stop at a location of the working platform, the lock mechanism 23 can be operated to stop the spindles 21 and the rollers 22 coupled with the spindles 21.

Figure 6:
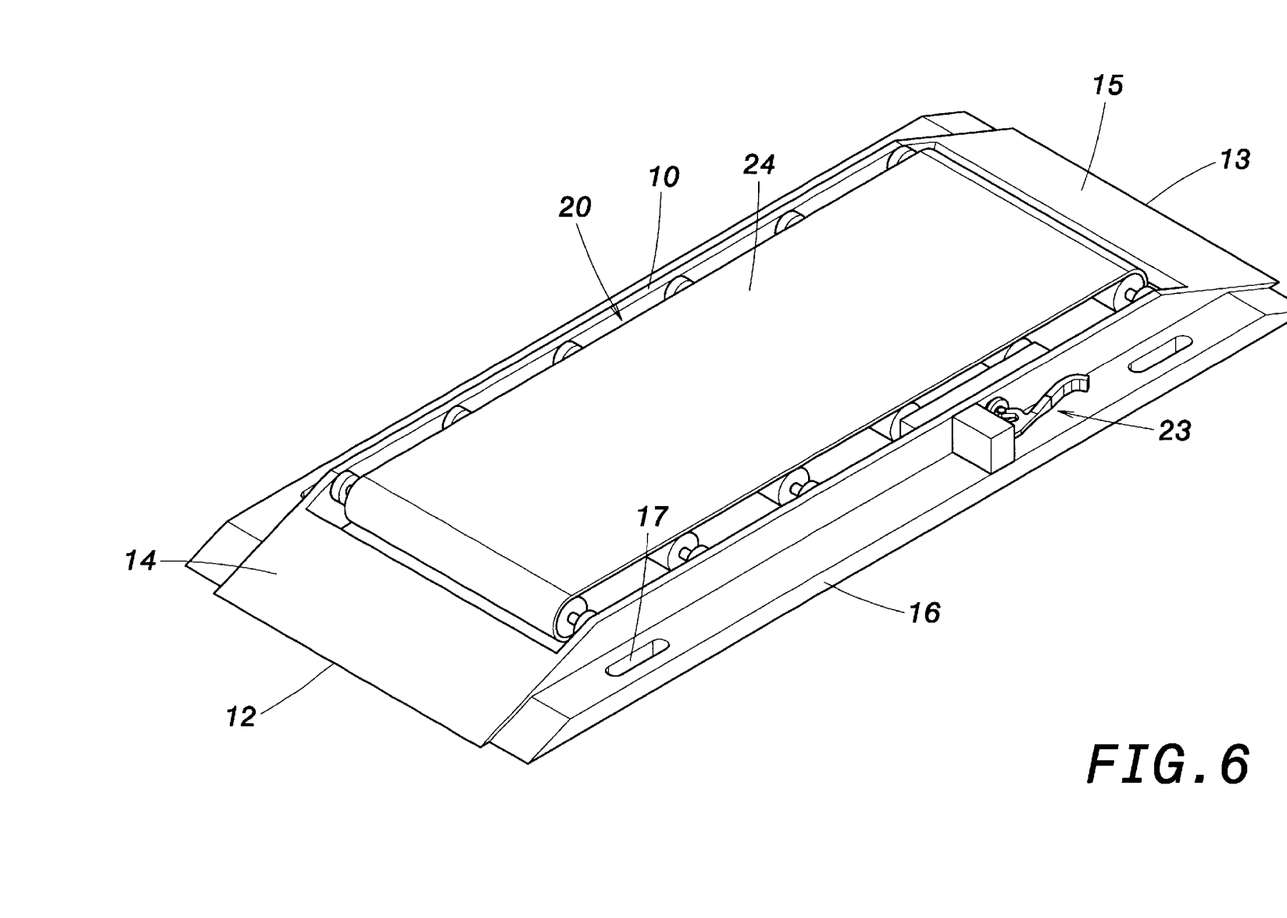
FIG. 6 is a perspective view of a working platform according to a second embodiment of the invention.

In FIG. 6, the guide mechanism 20 can be a belt 24 moving along the frame 10.

With the above working platform of the invention, while the conveying belt 50 is moving, the workpieces on the conveying belt 50 can be transferred to the working platform and stopped thereon. Therefore, the working platform provides the following advantages over the prior art:

1. Since the workpieces to be assembled are transferred from the conveying belt 50 to the working platform, the assembly precision is higher.

2. Since the workpieces are directly assembled on the assembly line without manual transfer to another place or working table, the assembly time is therefore reduced.

3. Besides, the assembly operation with the working platform of the invention is more convenient, especially in the case of bulky workpieces.

Figure 7:
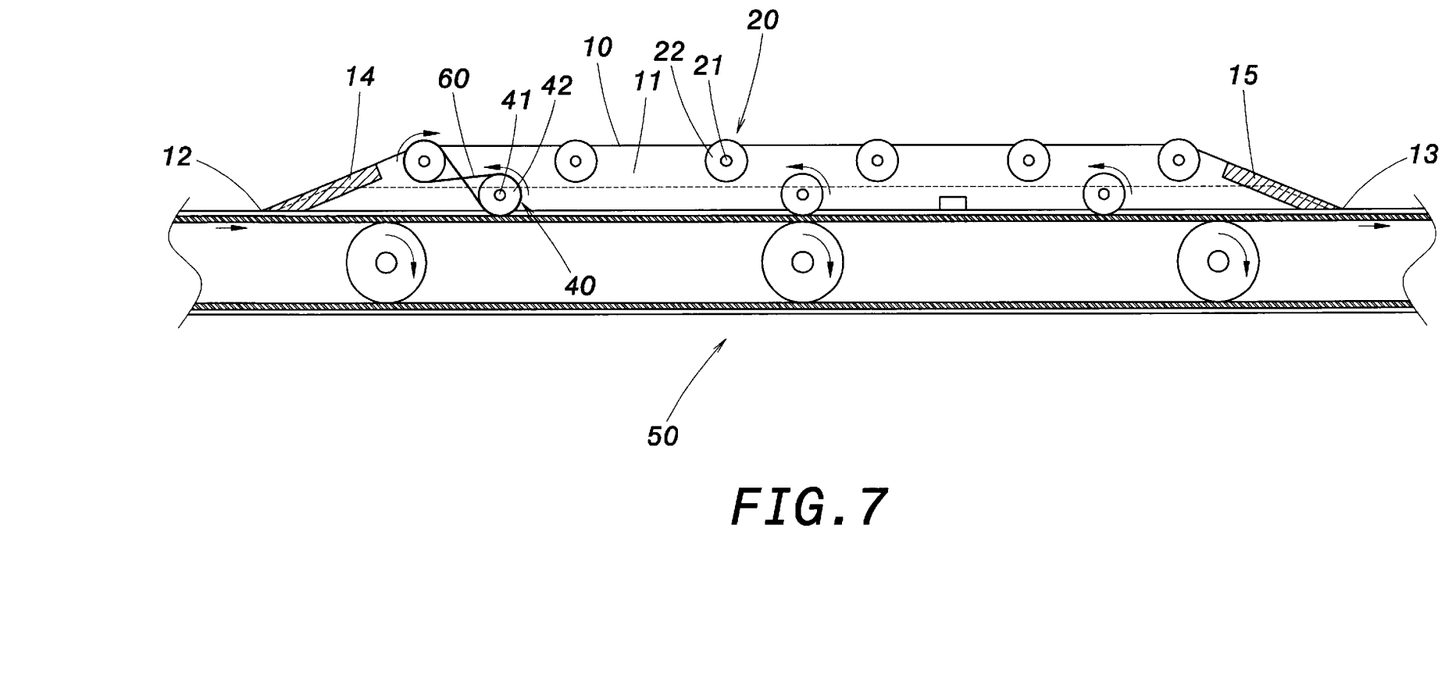
FIG. 7 is a cross-sectional view of a working platform mounted on an assembly line according to a third embodiment of the invention.

In FIG. 7, the spindle 21 of the guiding mechanism 20 closest to the entry side 12 is coupled with the supporting spindle 41 of the supporting structure 40 by means of a transmission mechanism 60 such as a belt set, a chain set and a gear set. When the supporting roller 42 rotates as the conveying belt 50 moves, the transmission mechanism 60 drives the spindle 21 of the guiding mechanism 20 closest to the entry side 12 in rotation, thereby drives the workpieces from the conveying belt 50 to the working platform.

Figure 8:
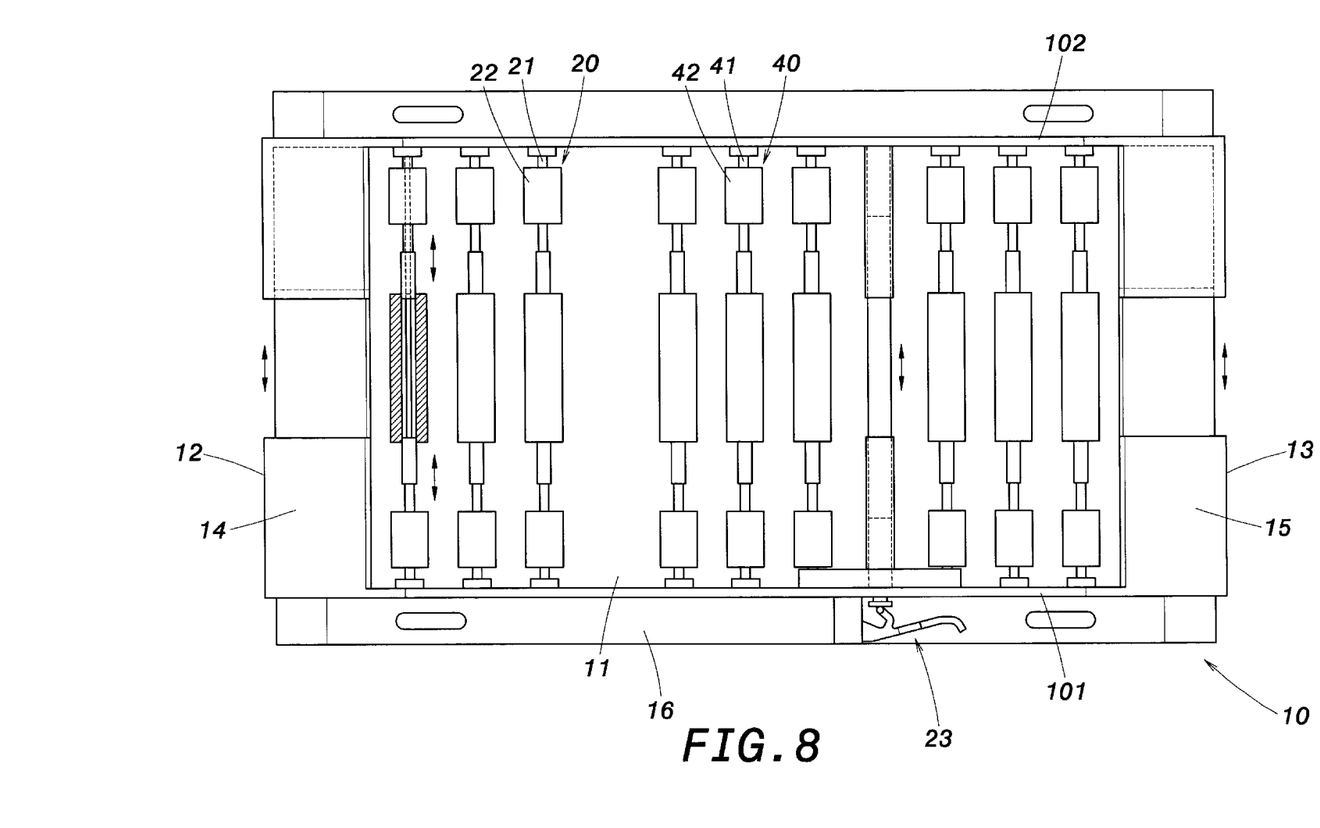
FIG. 8 is a top view of a working platform according to a forth embodiment of the invention.

In FIG. 8, the frame 10 includes a first frame portion 101 and a second frame portion 102 that are detachably connected in a manner that a width of the frame 10 is adjustable. The dimensions of each of the guiding mechanism 20 and the supporting structure 40 vary according to the dimension of the frame 10.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A working platform for an assembly line, comprising:
    a frame, mounted above a conveying belt of the assembly line, wherein the frame oppositely has an entry side and an exit side;
    a guiding mechanism, mounted in the frame;
    wherein the frame has an attachment member extended, from one side thereof, and the attachment member has a plurality of slots through which screws, for fixing the frame to a fixing rod of the conveying belt can be inserted.

2. The working platform of claim 1, wherein the frame defines a space in which the guiding mechanism is inside the frame.

3. The working platform of claim 1, wherein a plurality of inclined surfaces are respectively formed in the entry side and the exit side.

4. The working platform of claim 1, further comprising a supporting arrangement that includes a plurality of supporting spindles seperately and pivotally connected to the frame and a plurality of supporting rollers respectively coupled with the supporting spindles, the supporting rollers downwardly protruding from the frame for contacting the supporting rollers with the underlying conveying belt.

5. The working platform of claims 4, wherein the guiding mechanism at a location proximate to the entry side is coupled with the supporting arrangement by means of a transmission mechanism.

6. The working platform of claim 1, wherein the frame is further provided with a lock mechanism connected to the guiding mechanism.

7. The working platform of claim 1, wherein each of the frame and the guiding mechanism have expandably adjusted dimensions.

8. The working platform of claim 1, wherein the guiding mechanism includes a plurality of spindles pivotally connected to the frame and a plurality of rollers respectively coupled with the spindles, and the spindles are separately disposed, each of the spindles and rollers being perpendicular to the moving direction of the conveying belt, and the rollers upwardly protruding over the frame.

9. The working platform of claim 1, wherein the guiding mechanism is a belt circulating along the frame.

10. A working platform for an assembly line, comprising:
    a frame, mounted above a conveying belt of the assembly line, wherein the frame oppositely has an entry side and an exit side;
    a guiding mechanism, mounted in the frame; and
    a supporting arrangement that includes a plurality of supporting spindles separately and pivotally connected to the frame and a plurality of supporting rollers respectively coupled with the supporting spindles, the supporting rollers downwardly protruding from the frame for contacting the supporting rollers with the underlying conveying belt.

11. The working platform of claim 10, wherein the frame defines a space in which the guiding mechanism is inside the frame.

12. The working platform of claim 10, wherein a plurality of inclined surfaces are respectively formed in the entry side and the exit side.

13. The working platform of claim 10, wherein the frame is further provided with a lock mechanism connected to the guiding mechanism.

14. The working platform of claim 10, wherein each of the frame and the guiding mechanism have expandably adjusted dimensions.

15. The working platform of claim 10, wherein the guiding mechanism is a held circulating along the frame.

16. A working platform for an assembly line, comprising:
    a frame, mounted above a conveying belt of the assembly line, wherein the frame oppositely has an entry side and an exit side;
    a guiding mechanism, mounted in the frame; and
    wherein the guiding mechanism includes a plurality of spindles pivotally connected to the frame and a plurality of rollers respectively coupled with the spindles, and the spindles are separately disposed, each of the spindles and rollers being perpendicular to the moving direction of the conveying belt, and the rollers upwardly protruding over the frame.

17. The working platform of claim 16, wherein the frame defines a space in which the guiding mechanism is inside the frame.

18. The working platform of claim 16, wherein a plurality of inclined surfaces are respectively formed in the entry side and the exit side.

19. The working platform of claim 16, wherein the frame is further provided with a lock mechanism connected to the guiding mechanism.

20. The working platform of claim 16, wherein each of the frame and the guiding mechanism have expandably adjusted dimensions.

* * * * *